US012196168B2

(12) United States Patent
Cress et al.

(10) Patent No.: US 12,196,168 B2
(45) Date of Patent: Jan. 14, 2025

(54) SPARKPLUG HAVING CATHODE AND ANODE COMPOSITIONS FOR EXTENDED SERVICE LIFE

(71) Applicant: Caterpillar Inc., Peoria, IL (US)

(72) Inventors: James J. Cress, West Lafayette, IN (US); Sean J. Moser, Bellingham, WA (US); Christopher M. Hoops, Bellingham, WA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/296,394

(22) Filed: Apr. 6, 2023

(65) Prior Publication Data

US 2024/0337234 A1 Oct. 10, 2024

(51) Int. Cl.

| | |
|---|---|
| ***F02P 13/00*** | (2006.01) |
| ***F02B 19/12*** | (2006.01) |
| ***F02P 3/04*** | (2006.01) |
| ***H01T 13/39*** | (2006.01) |

(52) U.S. Cl.

CPC .............. *F02P 13/00* (2013.01); *F02B 19/12* (2013.01); *F02P 3/04* (2013.01); *H01T 13/39* (2013.01)

(58) Field of Classification Search

CPC .. F02P 13/00; F02B 19/12; H01T 1/22; H01T 1/24; H01T 13/39; H01T 13/46; H01T 13/54

See application file for complete search history.

(56) References Cited

U.S. PATENT DOCUMENTS

| | | | | |
|---|---|---|---|---|
| 3,958,144 | A | 5/1976 | Franks | |
| 8,536,769 | B2 | 9/2013 | Kuhnert et al. | |
| 9,972,979 | B2 | 5/2018 | Kuhnert | |
| 11,035,334 | B1 | 6/2021 | Cress | |
| 11,156,148 | B1 * | 10/2021 | Engineer | H01T 13/467 |
| 11,757,262 | B1 * | 9/2023 | Lykowski | H01T 13/36 313/141 |
| 2001/0013746 | A1 * | 8/2001 | Kanao | H01T 13/39 313/144 |
| 2002/0063504 | A1 | 5/2002 | Hori | |
| 2002/0180326 | A1 * | 12/2002 | Francesconi | H01T 13/54 313/140 |
| 2006/0082276 | A1 | 4/2006 | Havard | |
| 2009/0107439 | A1 | 4/2009 | Schultz | |

(Continued)

FOREIGN PATENT DOCUMENTS

| | | | | |
|---|---|---|---|---|
| DE | 102020104953 A1 | 8/2021 | | |
| KR | 100937000 B1 | 1/2010 | | |
| WO | WO-2009059340 A1 * | 5/2009 | | H01T 13/39 |

OTHER PUBLICATIONS

Written Opinion and International Search Report for Int'l. Patent Appln. No. PCT/US2024/018289, mailed Jun. 21, 2024 (14 pgs).

*Primary Examiner* — Grant Moubry

(74) *Attorney, Agent, or Firm* — Brannon Sowers & Cracraft PC

(57) ABSTRACT

A sparkplug includes a sparkplug housing, a cathode including at least one electrode prong and being formed predominantly of iridium, and an anode formed at least predominantly of iron or steel. The material compositions of the cathode and anode provide for extended sparkplug service life, especially in high power density applications employing a prechamber sparkplug. Related methodology is also disclosed.

20 Claims, 3 Drawing Sheets

(56) References Cited

U.S. PATENT DOCUMENTS

| | | | | |
|---|---|---|---|---|
| 2011/0089803 | A1* | 4/2011 | Francesconi | H01T 13/467 313/11.5 |
| 2015/0028737 | A1* | 1/2015 | Alfonso | H01T 13/54 313/125 |
| 2016/0319797 | A1* | 11/2016 | Reimann | F02P 3/04 |
| 2017/0145898 | A1* | 5/2017 | Schäfer | F02P 13/00 |
| 2020/0185888 | A1 | 6/2020 | Niessner | |
| 2022/0416515 | A1 | 12/2022 | Cress | |
| 2023/0103567 | A1* | 4/2023 | Hageneder | H01T 13/54 123/293 |
| 2023/0318265 | A1* | 10/2023 | Koenig | H01T 21/02 313/123 |

* cited by examiner

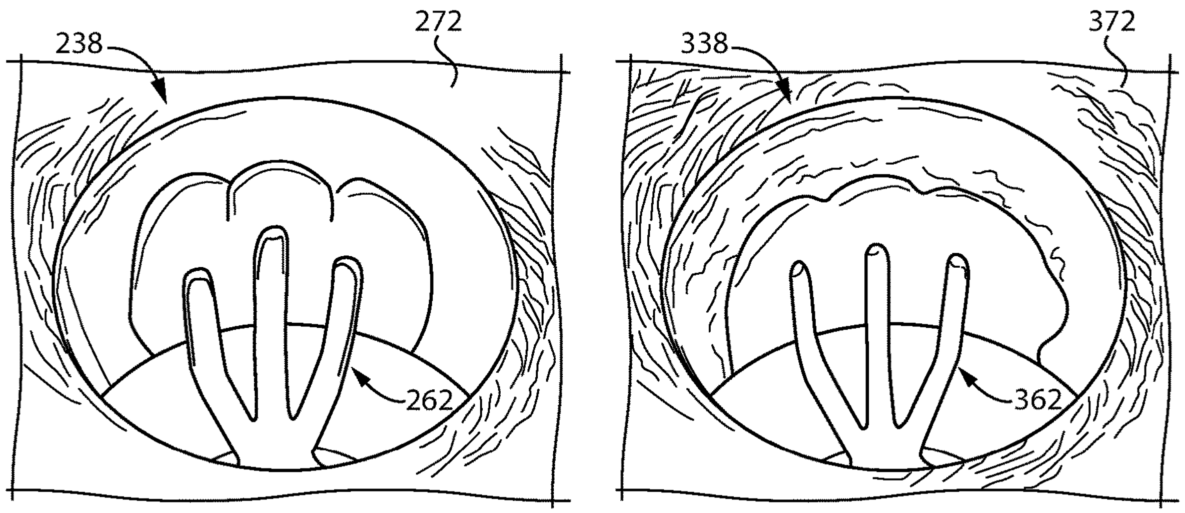
FIG. 6
FIG. 7
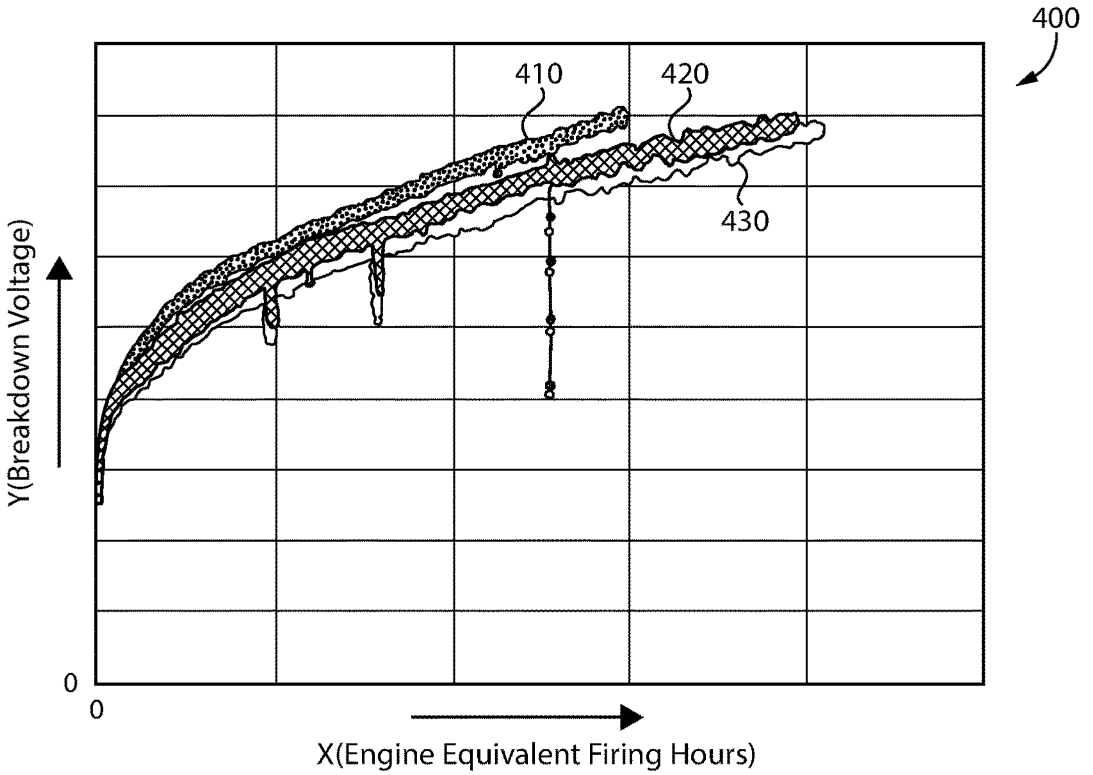
FIG. 8

SPARKPLUG HAVING CATHODE AND ANODE COMPOSITIONS FOR EXTENDED SERVICE LIFE

TECHNICAL FIELD

The present disclosure relates generally to a sparkplug, and more particularly to a sparkplug having an iridium cathode and an iron or steel anode configured for extended service life.

BACKGROUND

Sparkplugs have been used in internal combustion engines for well over a century. Sparkplugs are employed to generate an electrical spark that ignites a mixture of a fuel and air in an engine cylinder to cause a controlled combustion reaction that drives a piston to rotate a crankshaft. Many different sparkplug designs are known, including so-called J-gap or other open sparkplugs conventionally used in automobile engine, as well prechamber sparkplugs used in a variety of applications including heavy duty engine applications, commonly operated at stoichiometrically lean air-fuel ratios.

Sparkplugs are commonly considered consumable parts having a service life that can be considerably less than a service life of the overall engine platform. The physics involved in spark generation tend to cause ejection of ions of the spark electrode materials when a spark is produced, causing erosion of the electrodes over time. In most systems, as erosion of the electrodes proceeds a spark gap between a cathode electrode and an anode electrode eventually become so large that the voltage potential required to produce a spark that can bridge the spark gap becomes impracticably high. When the so-called breakdown voltage becomes too high the sparkplugs are typically replaced.

Sparkplugs employed in many modern engines often include electrodes formed of precious metals demonstrated to extend service life over conventional materials. For instance, it is conventionally known that an iridium cathode paired with a nickel anode provides a longer service life than certain other combinations of materials. Engineers have also experimented with a wide variety of other combinations of metallic materials, incrementally improving sparkplug service life but often with increased material costs.

In recent years many engine platforms have been developed or modified in an effort to achieve increased power density, where a relatively smaller or more lightweight engine produces increased power output as compared to conventional arrangements. Increased power density, where relatively more fuel and air is combusted in a given cylinder size in each engine cycle has resulted in new challenges relative to sparkplug service life, in some instances requiring more frequent sparkplug replacement. One known sparkplug strategy for extended service life is set forth in U.S. Pat. No. 11,035,334B1 to Cress.

SUMMARY OF THE INVENTION

In one aspect, a sparkplug includes a sparkplug housing defining a longitudinal axis, a first electrode including at least one electrode prong, and a second electrode including an electrode surface extending circumferentially around the longitudinal axis and spaced a spark gap distance from the at least one electrode prong. The first electrode is formed predominantly of iridium, and the second electrode is formed at least predominantly of iron or steel.

In another aspect, a prechamber sparkplug includes a sparkplug housing forming a prechamber, a center electrode, and a ground electrode. The ground electrode includes a ground electrode surface, and a spark gap within the prechamber is defined between the center electrode and the ground electrode surface. The center electrode is formed predominantly of iridium, and the ground electrode surface is formed at least predominantly of iron or steel.

In still another aspect, a method of operating an ignition system for an internal combustion engine includes energizing an iridium electrode prong positioned at a spark gap distance in a prechamber sparkplug from an iron or steel anode, producing a spark at a spark gap defined between the iridium electrode prong and the iron or steel anode, and igniting a mixture of a gaseous fuel and air in an engine cylinder via the spark.

BRIEF DESCRIPTION OF THE DRAWINGS

FIG. 6 is a perspective view of a sparkplug of a known design removed after service:

FIG. 7 is a sparkplug according to the present disclosure removed after service; and FIG. 8 is a graph illustrating engine firing hours in comparison to breakdown voltage for a sparkplug according to a known design in comparison to sparkplugs according to the present disclosure.

DETAILED DESCRIPTION

Figure 1:
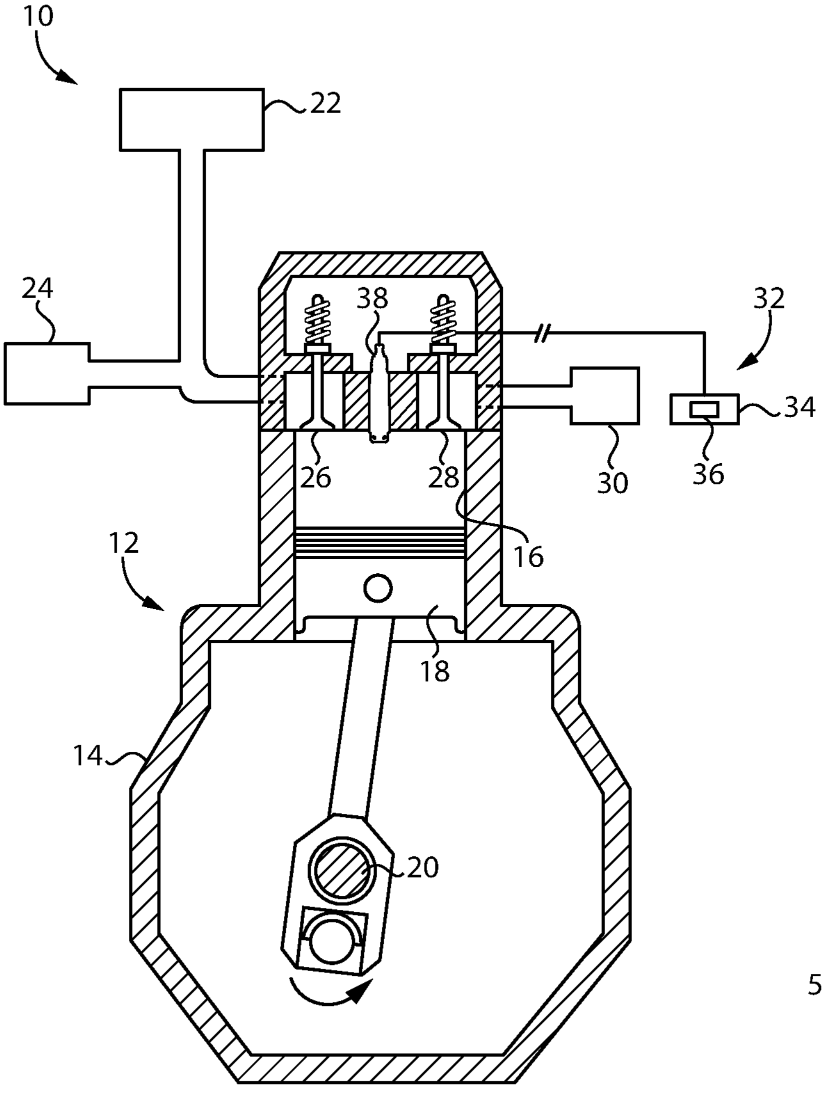
FIG. 1 is a diagrammatic view of an internal combustion engine system, according to one embodiment.

Referring to FIG. 1, there is shown an internal combustion engine system 10, according to one embodiment. Engine system 10 includes an engine 12 having an engine housing 14 with a combustion cylinder 16 formed therein. A piston 18 is movable in cylinder 16 between a bottom-dead-center position and a top-dead-center position in a generally conventional manner, typically in a four-stroke engine cycle. Piston 18 is coupled to a crankshaft 20 that can be operated to rotate a load such as an electrical generator, a driveline in a land or marine vehicle, a pump, a compressor, or still others. Cylinder 16 may be one of any number of cylinders in any suitable arrangement, such as an in-line pattern, a V-pattern, or still another.

Engine system 10 also includes an air inlet 22 and a fuel supply 24 together structured to provide a flow of a fuel and air to cylinder 16. Engine system 10 may be turbocharged and might include a compressor in a turbocharger to compress intake air or a mixture of intake air and a fuel for conveyance to cylinder 16. Fuel may be admitted by fumigation, but could be port injected or direct injected, for example, in other embodiments. Exhaust from cylinder 16 is conveyed to an exhaust outlet 30 potentially by way of aftertreatment apparatus (not shown). An intake valve 26 movable in engine housing 14 controls a flow of intake air and fuel into cylinder 16. An exhaust valve 28 conventionally operates to control a flow of exhaust to exhaust outlet 30. In a practical implementation engine 12 operates on a gaseous fuel such as methane, ethane, natural gas, or various blends of hydrocarbon fuels and non-hydrocarbon fuels including hydrogen.

Engine system 10 also includes an ignition system 32. Ignition system 32 includes an electronic control unit 34 having or coupled to an ignition circuitry or coil 36. Ignition system 32 also includes a sparkplug 38 positioned to produce an electrical spark that ignites a mixture of a fuel such as a gaseous fuel and air in cylinder 16 for combustion. Sparkplug 38 may include a prechamber sparkplug.

Figure 2:
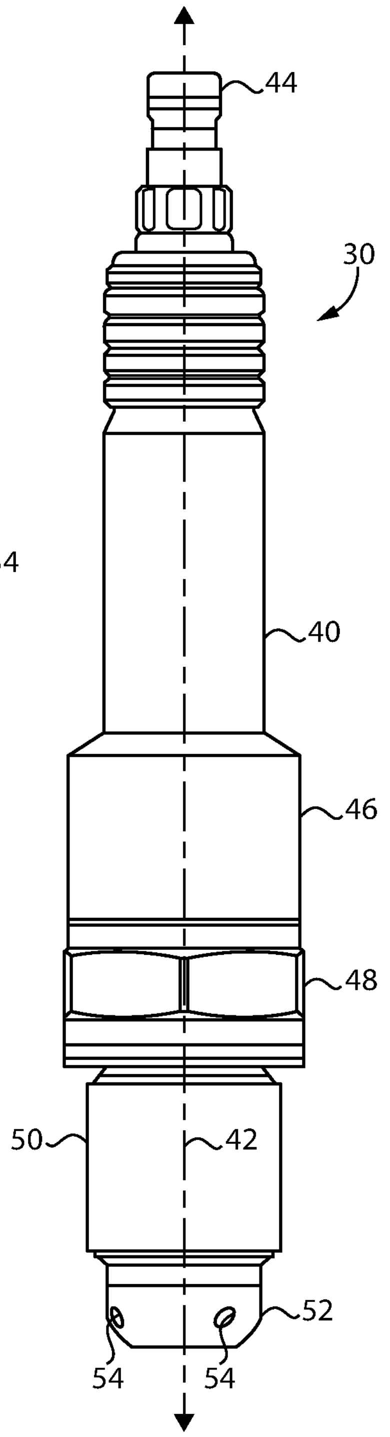
FIG. 2 is a diagrammatic view of a sparkplug, according to one embodiment.
Figure 3:
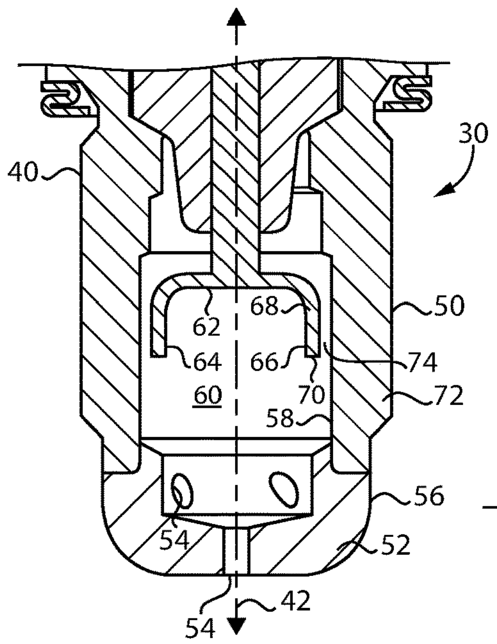
FIG. 3 is a sectioned side diagrammatic view of a portion of a sparkplug, as in FIG. 2.
Figure 4:
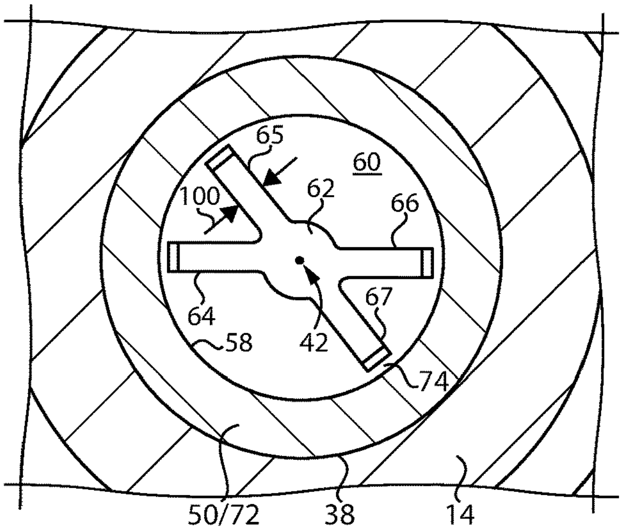
FIG. 4 is a sectioned axial view of a portion of a sparkplug as in FIGS. 2 and 3.

Referring also now to FIGS. 2-4, sparkplug 38 includes a sparkplug housing 40 defining a longitudinal axis 42. Sparkplug 38 also includes an electrical terminal 44 that electrically connects to ignition coil 36, an insulator 46, a hex 48, and a mounting section 50. Mounting section 50 may be externally threaded.

Sparkplug housing 40 may further include a prechamber tip 52 forming a prechamber 60 and including at least one outlet 54 from prechamber 60. As will be familiar to those skilled in the art moving of piston 18 in cylinder 16 can push a mixture of fuel and air through outlets 54 into prechamber 60 for ignition via a spark. The ignited fuel and air of an ignition charge in prechamber 60 can produce hot jets of combustion gases that exit sparkplug 38 through outlets 54 and ignite a larger main charge of a fuel and air in cylinder 16. Sparkplug housing 40 may further includes an outer surface 56 upon prechamber tip 52 and an inner surface 58 formed at least in part upon prechamber tip 52 that defines prechamber 60. The one or more outlets 54 extend from inner surface 58 to outer surface 56. Inner surface 58 may form an electrode surface including an anode or ground electrode surface as further discussed herein.

Sparkplug 38 further includes a first electrode 62 including at least one electrode prong 64. First electrode 62 may be electrically connected to terminal 44 and thus electrically connected in ignition system 32 to ignition coil 36. Ignition coil 36 may be structured to energize first electrode 62 as a cathode. In the illustrated embodiment first electrode 62 includes a plurality of electrode prongs 64, 65, 66, and 67. Each respective electrode prong may include a leg portion 68 that curves towards an electrode tip 70. Sparkplug 38 also includes a second electrode 72. Second electrode 72 may function as a ground electrode or anode, and includes an electrode surface extending circumferentially around longitudinal axis 42 and spaced a spark gap distance from the at least one electrode prong 64, 65, 66, 67. As noted above inner surface 58 may form the ground electrode surface of second electrode or anode 72.

As can be seen from FIG. 4, four electrode prongs are part of first electrode 62. It is contemplated that a single electrode prong might be used in some embodiments, or more than four electrode prongs such as 6, 7, or 8, based circumferentially around longitudinal axis 42. When sparkplug 38 is placed in service and an electrical spark is produced at spark gap 74 emission of ions from first electrode 62 and second electrode 72 can occur resulting in erosion of the electrode materials over time. It has been discovered that a combination of an iridium cathode and an iron or steel anode can result in longer service life than what might be conventionally obtained, including a service life extended by up to 30% or even more compared to conventional prechamber sparkplugs including an iridium cathode and a nickel anode or other combinations of materials.

To this end, first electrode 62 may be formed predominantly of iridium. Second electrode 72 may be formed at least predominantly of iron or steel. In an embodiment, second electrode 72 consists essentially of iron or steel. In a further refinement, second electrode 72 may consist essentially of a low carbon steel with no alloying elements at all, such as ST523 mild steel. The second electrode or anode may be substantially free of nickel, meaning second electrode 72 may contain no more than trace amounts of nickel. In a refinement, first electrode 62 may be at least 90% iridium, and in a further refinement at least 95% iridium. In a still further refinement first electrode 62 may be approximately 97% iridium, with a balance made up of other elements. First electrode 62 may be formed in part of at least one of rhodium, hafnium, or niobium. One practical implementation includes a first electrode that is predominantly iridium with a balance of first electrode 62 including in whole or in part rhodium.

Figure 5:
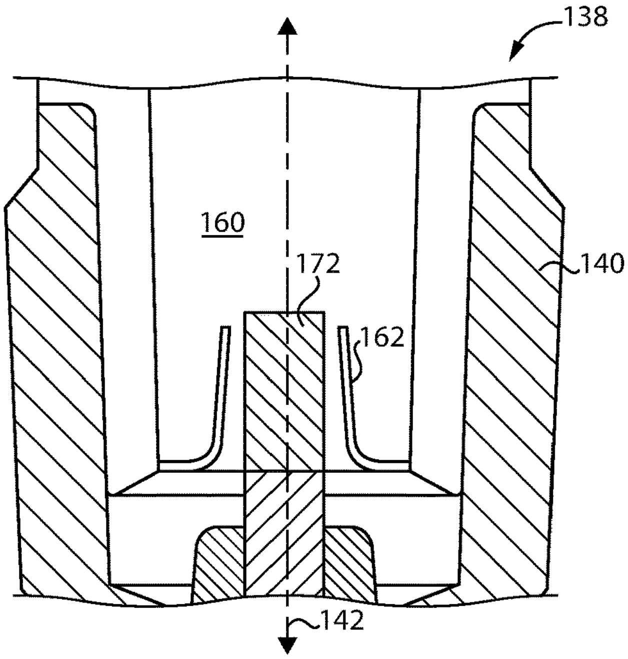
FIG. 5 is a sectioned side diagrammatic view of a portion of a sparkplug, according to another embodiment.

As can be seen from FIG. 4, the plurality of electrode prongs 64, 65, 66, 67 are spaced circumferentially around longitudinal axis 42. It can also be noted electrode surface 58 extends circumferentially around the plurality of electrode prongs and is spaced radially from the plurality of electrode prongs. In FIG. 4 electrode surface 58 is spaced radially outward from the plurality of electrode prongs. Turning now to FIG. 5, there is shown another embodiment having a different configuration. In FIG. 5 a prechamber sparkplug 138 includes a sparkplug housing 140 defining a longitudinal axis 142. A first electrode or cathode is shown at 162 and would be understood to include a plurality of electrode prongs spaced circumferentially around longitudinal axis 142. A second electrode or anode 172 is positioned radially inward of first electrode 162. It will thus be appreciated that in the case of the embodiment of FIGS. 2-4 first electrode 162 includes a center electrode and second electrode 172 includes an outer electrode, whereas in the case of FIG. 5 a first electrode or cathode 162 includes an outer electrode and a second electrode or anode 172 includes a center electrode. The material composition of electrode 162 may be analogous to the material composition of electrode 62, and the material composition of electrode 172 may be analogous to the material composition of electrode 72.

INDUSTRIAL APPLICABILITY

Still referring to the drawings generally, but also now to FIG. 6 and FIG. 7, FIG. 6 shows a sparkplug 238 removed from service after having been fired in an actual engine or an environment simulating firing in an engine. Sparkplug 238 includes a sparkplug with a cathode 262 formed predominantly of iridium, and an anode 272 formed at least predominantly of nickel. FIG. 7 shows a sparkplug fired in an engine or an environment simulating an engine, and includes a cathode 362 formed predominantly of iridium, and an anode 372 formed of steel. Comparing FIG. 6 to FIG. 7 it can be readily appreciated that erosion of material from cathode 262 in the known design is significantly more severe than erosion of cathode 362 in the design according to the present disclosure. FIGS. 6 and 7 represent actual test sparkplugs experiencing similar service conditions.

Referring now also to FIG. 8, there is shown a graph 400 of actual test data illustrating breakdown voltage on the Y-axis in comparison to engine equivalent firing hours on the X-axis including a trace 410 for a sparkplug according to a known design (analogous to sparkplug 238 in FIG. 6) in comparison to traces 420 and 430 for sparkplugs according to the present disclosure. As discussed above, sparkplug service life is typically limited by breakdown voltage becoming high enough that continued firing becomes impractical. It can be seen that breakdown voltage for the known sparkplug 410 increases relatively more rapidly than it does for sparkplugs 420 and 430. The ends of traces 420 and 430 show a maximum breakdown voltage after a greater number of service hours than the end of trace 410, clearly demonstrating an extended service life over the known design. The extended service life reflects the surprising discovery that pairing of an iridium based cathode with an iron based anode results in less material erosion than is the case using the conventionally employed iridium cathode and nickel anode.

As also noted above increased power density in certain engines has increased the challenges to extending sparkplug service life. Operating an ignition system according to the present disclosure can include energizing an iridium electrode prong positioned at a spark gap distance in a prechamber sparkplug from an iron or steel anode. Fuel and air has been urged into the prechamber based on movement of a piston, such that production of the spark triggers combustion of the fuel and air in the prechamber to cause ignition of a main charge in the associated cylinder as discussed herein. While the present disclosure is not limited to any particular firing density, in some applications the mixture of gaseous fuel and air in an engine cylinder may have a density of at least 20 kilograms per cubic meter, at least 25 kilograms per cubic meter, or potentially still higher.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sparkplug comprising:

a sparkplug housing defining a longitudinal axis;

a first electrode including at least one electrode prong;

a second electrode including an electrode surface extending circumferentially around the longitudinal axis and spaced a spark gap distance from the at least one electrode prong;

the first electrode, including the at least one electrode prong, being a cathode formed of a first electrode material that is predominantly iridium; and the second electrode being an anode formed of a second electrode material that is at least predominantly iron or steel; and a spark gap is defined between the first electrode material and the second electrode material.

2. The sparkplug of claim 1 wherein the second electrode consists essentially of iron or steel.

3. The sparkplug of claim 1 wherein the first electrode includes a plurality of electrode prongs spaced circumferentially around the longitudinal axis.

4. The sparkplug of claim 3 wherein the electrode surface extends circumferentially around the plurality of electrode prongs and is spaced radially outward of the plurality of electrode prongs.

5. The sparkplug of claim 1 wherein the sparkplug housing includes a prechamber tip forming a prechamber and including at least one outlet from the prechamber, and the spark gap is within the prechamber and defined between the at least one electrode prong and the electrode surface.

6. The sparkplug of claim 5 wherein the prechamber tip includes an outer surface, and the sparkplug housing includes an inner surface forming the electrode surface.

7. The sparkplug of claim 1 wherein the first electrode is formed in part of at least one of rhodium, hafnium, or niobium, and the second electrode is substantially free of nickel.

8. The sparkplug of claim 7 wherein the first electrode is at least 90% iridium.

9. The sparkplug of claim 8 wherein the first electrode is at least 95% iridium.

10. An ignition system including the sparkplug of claim 1 and further comprising an electrical terminal electrically connected to the first electrode, and an ignition coil coupled to the electrical terminal and structured to energize the first electrode as the cathode.

11. A prechamber sparkplug comprising:

a sparkplug housing forming a prechamber;

a center electrode;

a ground electrode;

the center electrode including a cathode and having an electrode prong having a center electrode surface, and the ground electrode including an anode and having a ground electrode surface, and a spark gap within the prechamber is defined between the center electrode surface and the ground electrode surface;

the center electrode and the center electrode surface being formed predominantly of iridium; and the ground electrode surface being formed at least predominantly of iron or steel.

12. The prechamber sparkplug of claim 11 wherein the ground electrode is substantially free of nickel.

13. The prechamber sparkplug of claim 12 wherein the center electrode is at least 90% iridium.

14. The prechamber sparkplug of claim 13 wherein a balance of the center electrode includes rhodium, and the ground electrode is formed of a low carbon steel.

15. The prechamber sparkplug of claim 11 wherein the center electrode includes a plurality of electrode prongs.

16. The prechamber sparkplug of claim 15 wherein the sparkplug housing includes a prechamber tip and forms the ground electrode.

17. The prechamber sparkplug of claim 16 wherein the ground electrode surface extends circumferentially around the plurality of electrode prongs and is spaced radially from the plurality of electrode prongs.

18. A method of operating an ignition system for an internal combustion engine comprising:

energizing an iridium electrode prong positioned at a spark gap distance in a prechamber sparkplug from an iron or steel anode;

producing a spark at a spark gap defined between the iridium electrode prong and the iron or steel anode; and igniting a mixture of a gaseous fuel and air in an engine cylinder via the spark.

19. The method of claim 18 wherein the iridium electrode is formed of iridium plus a balance of at least one of rhodium, hafnium, or niobium, and the iron or steel anode is substantially free of nickel.

20. The method of claim 19 wherein the mixture of gaseous fuel and air in the engine cylinder has a density of at least 20 kilograms per cubic meter.

* * * * *